United States Patent [19]

Kreft

[11] 3,850,722

[45] Nov. 26, 1974

[54] COMPONENT FOR TRANSMITTING FORCES

[75] Inventor: Holger Kreft, Karlsfeld, Germany

[73] Assignee: Maschinenfabrik Augsburg Nurberg Aktiengesellschaft, Munich, Germany

[22] Filed: Sept. 18, 1972

[21] Appl. No.: 289,643

[30] Foreign Application Priority Data
Aug. 1, 1972  Germany............................ 2237775
Sept. 18, 1971 Germany............................ 2146783

[52] U.S. Cl.................. 156/172, 156/425, 156/446
[51] Int. Cl............................................. B65h 81/02
[58] Field of Search .......... 156/169, 172, 173, 175, 156/425, 446

[56] References Cited
UNITED STATES PATENTS

| | | | |
|---|---|---|---|
| 2,744,043 | 5/1956 | Ramberg............................ | 156/155 |
| 2,747,616 | 5/1956 | DeGanahl.......................... | 156/175 |
| 2,848,133 | 8/1958 | Ramberg............................ | 156/173 |
| 2,858,992 | 11/1958 | Wentz................................ | 156/172 |
| 3,057,509 | 10/1962 | Bernd ................................ | 156/172 |
| 3,282,757 | 11/1966 | Brussee............................. | 156/172 |
| 3,429,758 | 2/1969 | Young ............................... | 156/173 |
| 3,449,182 | 6/1969 | Wiltshire............................ | 156/172 |
| 3,666,589 | 5/1972 | Alderfer............................ | 156/172 |
| 3,715,252 | 6/1973 | Fairbairn ........................... | 156/173 |

*Primary Examiner*—Daniel J. Fritsch
*Attorney, Agent, or Firm*—Craig & Antonelli

[57] ABSTRACT

A component for transmitting and sustaining axial tension and/or compression and/or torque forces, which component has a tubular mid-section portion of a fiber reinforced compound plastic, and an end fitting at either extremity thereof. An inner member of the end fitting is placed at either end of a shape imparting core having a longitudinally extending centerline. A fiber which is first passed through a plastic or resin bath is wound upon one inner member along the core and then onto the other inner member whereupon the direction is reversed until a desired number of layers and wall thickness is obtained. The fiber is wound at a predetermined angle with respect to the centerline in each layer. An outer member is then clamped over the inner member and a portion of the fiber layer to complete the end fitting and the formed component is hardened or cured to provide a fiber reinforced tubular mid-section portion having the extremities securely bonded to the end fittings.

30 Claims, 5 Drawing Figures

COMPONENT FOR TRANSMITTING FORCES

The present invention relates to a tubular component for transmitting forces and for sustaining axial tension and/or compression and/or torque forces which component has a tubular mid-section formed of a wound fiber reinforced compound plastic, and an end fitting at either extremity thereof.

Conventional components intended for the transmission of great tensile or compressive forces, such as beams or shafts, are generally made of metal. While these metal components have a long service life, such components have the disadvantage of great weight, which in the case of moving parts causes severe wear on bearings as a result of the high bearing loads and which partially nullifies the advantage of long service life. Another consideration is the high cost of manufacture entailed by the type of material and the method of manufacture it requires. Ultimately, the employment of such components is entirely precluded in certain technical applications, such as aerospace, where the paramount requirement is minimum weight at a maximum of load capacity. This has prompted attempts to make the mid-section of such components of plastic material and butt-join it to end fittings. However, these butt joints connecting the mid-section to the end fittings have not proved strong and shorten the useful service life of such components. Thus, such components which are light in weight are also shorter lived and occasionally are inferior in terms of load capacity and safety.

A broad aim of the present invention is to provide a component for transmitting large tension and/or compression and/or torque forces which component is light weight, has a long service life, and overcomes the disadvantages of prior art components.

It is an object of the present invention to provide a component in which the tubular mid-section is formed of a fiber reinforced compound body which is tapered at its extremities and joined at the ends to a two-piece end fitting such that the body is externally slipped over the contoured surface of the inner member of the respective fitting and is loaded against the inner memver by means of the outer member of the end fitting, the two clamping members of each end fitting being characterized by their concavely dished contours where they contact with the compound tube.

A component manufactured in accordance with the present invention is distinguished by its low weight coupled with a capability to transmit compressive and tensile as well as torsional forces. Its strength makes the tubular mid-section suited for the transmission of large forces and the composition of its materials gives it a comparatively low weight with the particular type of connection between the mid-section body and the end fitting providing a long service life. An additional advantage inherent in such a component is that it is economical to manufacture.

In accordance with a feature of the present invention the outer member of either end fitting is loaded against the plastic mid-section by means of a clamping ring which is screwed onto the threaded neck portion of the respective inner member, the mid-section in turn being located against the contoured surface on the inner member of the end fitting.

In accordance with another feature of the present invention the reinforcing fiber is wound at an angle of from 30° to 60°, but preferably 45°, with the center line of the component, where relative to one another all layers are wound either codirectionally or counterdirectionally. The method of winding the reinforcing fiber at an angle results in significant simplicity and economy of manufacture of the component made in accordance with this invention. The narrower the angle of the wound fiber with the centerline of the tubular midsection, the greater is the capability to transmit axial forces. The torque capacity, however, declines in the same direction. An angle of 45° is considered best for the transfer of forces generally, but any angle between 30° and 60° is suitable for the transmission of forces. Winding angles of less than 45° are preferred for components under principally axial loads, and angles greater than 45° for components under predominantly torsional loads. When the fiber in the several layers are imbedded counterdirectionally from one layer to the next, but at the same winding angle, the capacity for alternating loads, such as compression/tension, is much improved and with it also the stiffness of the entire component. A further advantage offered by the present invention is that the particular configuration of the end fittings, or of their inner members, permits the uninterrupted winding of all the layers, even at very narrow angles, with a continuous filament which is then deflected when the inner member of the one end fitting is reached and is carried back in the opposite direction at the same winding angle.

In accordance with another feature of this invention, the plastic body incorporates a plurality of layers of reinforcing fiber, at least one layer of which consists of continuous reinforcing fiber strands wound around the component at right angles to its centerline while at least one other layer of fiber strands is wound in parallel to the centerline. With a component of this structure, axial forces on the one hand and torsional forces on the other are selectively transmitted by specific layers of fiber strands, the other layers then remaining unloaded. This segration of force transmitting elements affords the additional advantage that fiber layers intended for specific types of load can be wound for best results in that they are wound regardless of any other type of load in exactly the direction which best suits the direction of the force to be transmitted. This produces a component which is equally suited for the transmission of tension, compression and torque alike and which exhibits all the aforementioned advantages. The configuration of the end fittings of this invention likewise permits the continuous winding of fiber into looped layers and significantly also the continuous winding by machine of axially extending layers of fiber, which in accordance with prior art practice, were necessarily imbedded manually.

Another feature of the present invention relates to components intended for the transmission of predominantly axial forces wherein the torsional components of the axial forces are practically nil. In accordance with the present invention, the reinforcing fibers are then wound in parallel to the centerline of the tubular mid-section. The configuration of the end fittings provided by this invention permits these axially extending layers of reinforcing fibers to be continuously wound by machine by winding the endless fiber filaments or strands over the inner member of the respective end fittings, where they are deflected and then wound in the new direction. The manual method of positioning fiber strands as previously required for axial layers of fiber, where the continuity of fiber was interrupted at the extremities of the component being wound, is obviated by the configuration of the component of this invention. Thus, with the present invention, machine winding is now made feasible of axial layers of fiber which provides greater speed, economy and accuracy and, additionally, precisely defined layers of fiber.

In accordance with a further feature of the present invention, a carbon fiber is utilized as a reinforcing filament. The carbon fiber has modulus of elasticity which is superior to that of other reinforcing fibers and enables it to transmit exceptionally large forces.

In accordance with a still further feature of the present invention, the component is manufactured by a method in which the reinforcing fiber is first passed through a plastic coating bath and is then wound, together with the still unhardened plastic, over a shape imparting core clasped between the two end fittings, the method being characterized in that the fiber is wound beyond the length of the core as far as the contoured surface on the inner member of each end fitting, so that when the plastic hardens, the plastic soaked fiber and with it the plastic will form the mid-section and end fitting assembly as a suitable means for transmitting forces. This method enables the very economical manufacture of the component in a single operation, and it ensures by virtue of the bonded structure of the connection, a very resistant connection between the mid-section and the end fittings to add significantly to the intended long life of the part in service.

In accordance with a still further feature of the present invention the method makes use of a light-weight, shape imparting core of a plastic or aerated plastic material on which to wind the filament, the core being optionally permitted to remain in the tubular mid-section when the manufacture of the component is completed, but not being utilized in the transmission of forces.

These and further objects, features and advantages of the present invention will become more obvious from the following description when taken in connection with the accompanying drawing which shows, for purposes of illustration only, several embodiments in accordance with the present invention, and wherein.

Figure 1:
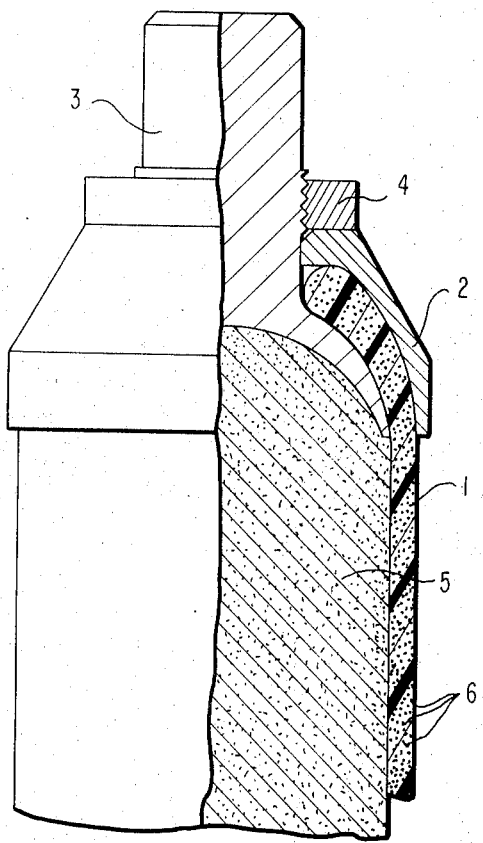
FIG. 1 is a partial view schematically illustrating in partial cross section one extremity of a component manufactured in accordance with the present invention.

Referring now to the drawings wherein like reference numerals are utilized to designate like parts throughout the several views, there is shown in FIG. 1 a component having a tubular mid-section and having at either extremity an end fitting. The end fitting is comprised of an inner member 3, an outer member 2 and a clamping nut 4. The shape imparting core which is utilized to form the component and which is made of an aerated plastic is designated by reference numeral 5 with fibers 6 forming the mid-section.

In the manufacture of the component, the inner members 3 of the end fittings, together with the aerated porous core 5, are loaded and aligned in a winding machine. A synthetic fiber such as boron, carbon or glass, after coating in a bath of nonhardened plastic or resin, is then wound over the core 5 and the dished mating surface on the inner member 3 beginning at the inner portion of the dished outer contour of the inner member at one end and proceeding along the porous core to the inner end of the dished outer contour of the inner member at the other end of the component. This winding process is continued until the mid-section has the intended wall thickness. The outer members 2 are then slipped over the inner members 3 and loaded against the dished outer contour on the inner members 3 by means of the ring nut 4 to establish a firm grip on the inserted extremities of the mid-section 1 between them. The assembled component is then hardened or cured in its entirety to produce an intimate, bonded connection of great strength between the outer member and the tubular mid-section as well as between the mid-section and the inner member.

Figure 2A:
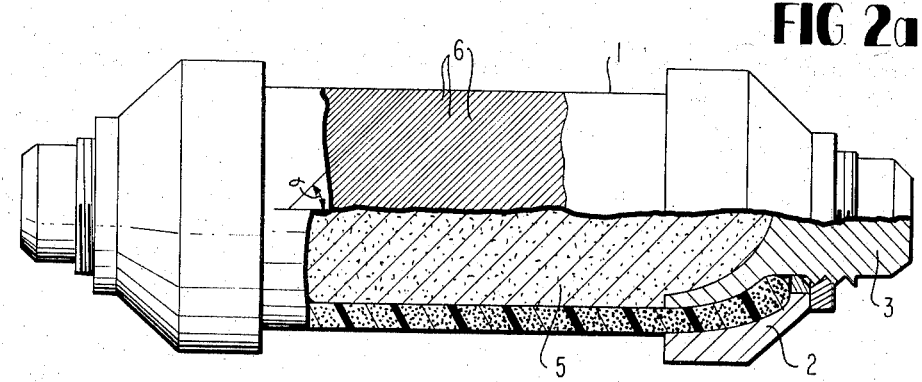
FIG. 2a is a view schematically illustrating in partial cross section a component manufactured in accordance with the present invention where the reinforcing fibers are wound codirectionally at an angle α with the component centerline.

FIG. 2a illustrates a component manufactured in accordance with this invention where the reinforcing fiber 6 is wound in codirectional layers at an angle α with respect to the longitudinal center line of the component. The narrower the angle α of the wound fiber with respect to the centerline of the tubular mid-section, the greater is the capability to transmit axial loads. The torque capacity, however, declines in the same direction such that an angle of 45° is considered best for the transfer of forces generally, but any angle of between 30° and 60° is generally suitable for the transmission of forces. Angles of less than 45° are preferred for principally axial loads and angles greater than 45° for predominantly torsional loads.

Figure 2B:
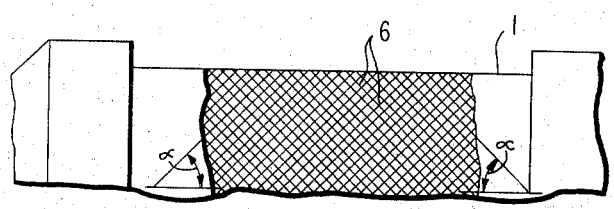
FIG. 2b is a partial view schematically illustrating a component manufactured in accordance with the present invention where the reinforcing fibers are wound in counterdirectional layers at an angle α with the component centerline.

FIG. 2b relates to a similar component where in addition to the winding of the fibers in the manner of FIG. 2a, the layers of fiber 6 are now wound counterdirectionally at an angle α with respect to the centerline. When the fibers in the several layers are imbedded counterdirectionally from one layer to the next, but at the same winding angle, the capacity for alternating loads, such as compression/tension is improved.

The fiber-reinforced compound body illustrated in FIG. 33 comprises over its length between the end fittings various layers of fibers 6a, 6b, 6c, where the fiber is wound alternately in parallel to (6a, 6c) and at right angles (6b) to the component centerline. This type of fiber winding provides a component in which axial forces on one hand and torsional forces on the other hand are selectively transmitted by the specifically wound fiber layer with the other layers remaining unloaded.

Figure 4:
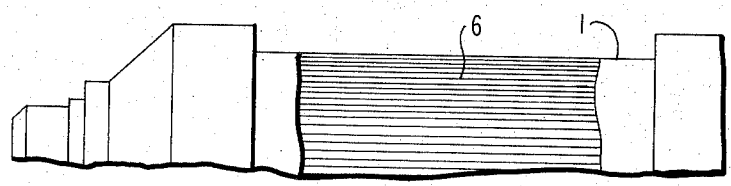
FIG. 4 is a partial view schematically illustrating a component manufactured in accordance with the present invention where the reinforcing fibers are wound in parallel to the component centerline.

FIG. 4 illustrates a component manufactured in accordance with the present invention where the fiber 6 in the fiber-reinforced compound body 1 between the two end fittings is wound in a direction parallel to the component centerline. This type of fiber winding provides a component intended for the transmission predominantly axial forces. The configuration of the end fittings, particularly the dished outer counter in the inner member 3 permits these axially extending layers of reinforcing fibers to be continuously wound by machine by winding the endless fiber filaments over the inner member of the respective end fitting, where the filaments are deflected and then wound in the new direction.

It should be noted that in accordance with the present invention, the layers of wound fiber may be imbedded in the compound body not only in vertical and parallel directions to the component centerline but additonally also in an oblique direction to it. Additionally, the synthetic fibers in conjuction with the present invention are made of a material which affords great strength even at thin cross sections. As a particular feature of this invention a plurality of very delicate filaments may be gathered into parallel bundles or may be suitably braided. The preferred fiber material is carbon. However, the material for the fiber may be glass, boron, or other suitable materials.

As is known in the art various types of cores 5, plastic or resin baths, fibers, as well as end fittings may be utilized in accordance with the teachings of the present invention. Thus, for example, the shape imparting core 5 may be a hard aerated plastic, polyurethane or polyacrylate. The plastic or resin bath may be formed of any suitable curable or hardenable platic or resin such as unsaturated polyester resins, cross linkable acrylic resins, epoxy resins, diallyphthalate resins, unsaturated carbohydrate resins or phenolic resins. The curing time for such resins vary in accordance with temperature with the curing time for such resins generally being approximately 18 hours at 100°C, 24 hours at 80°C and 36 hours at 60°C. The fibers which may be carbon, glass, boron or other suitable materials have a diameter in the range of 5–12 microns with, for example, carbon fibers having a range of 8–12 microns while the glass fibers utilized have a range of 5–9 microns. The end fittings having the contoured surface may be formed of steel or fiber reinforced plastic and have the core clasped therebetween in the manner indicated prior to having the fiber wound thereon.

The formed component is provided with dimensions as desired. However, the component generally has a length which varies in the range of approximately 100–200 mm and an outside diameter which is in the range of approximately 30–300 mm, the wall thickness of the tubular mid-section varies in the range of 3–30 mm and the number of layers of fiber utilized varies generally in the range of 10–50 layers depending upon the desired dimensions.

In accordance with the present invention, a component of the type illustrated in FIG. 2a, may be formed, for example, by passing carbon fibers having a diameter of 8 microns in an epoxy resin bath and winding the coated fiber at an angle of 45°with respect to the centerline beginning at one of the end fittings over the core and onto the other end fitting wherein the the direction of winding is reversed while maintaining the same 45° angle with respect to the centerline. In this manner the layers are wound codirectionally with respect to one another. The winding of the fiber is continued until the desired number of layers and wall thickness is acheived, for example 10 layers. Since the resin is in the unhardened or uncured state when the fiber is wound on the core, the resin penetrates the aerated core and forms an adhesive bond therewith upon curing. After the desired wall thickness is reached, the outer member of the end fitting is slipped over the inner member and a clamping ring is screwed onto the end fitting to provide a clamping force sufficient to ensure a good bond between the mid-section and the end fitting. The clamping force may, depending upon the dimensions of the formed component, may be on the order of 10–100 tons. The formed component is then cured for 24 hours at 80°C to provide a component with a tubular mid-section which is securely bonded to both the inner and outer members of the end fitting and which is light weight and is capable of transmitting and sustaining forces over a long service period.

Figure 3:
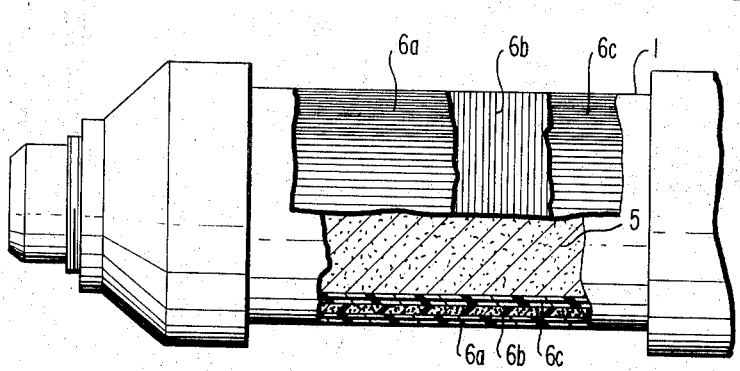
FIG. 3 is a partial view schematically illustrating a component manufactured in accordance with the present invention having diverse layers of fiber, where the fibers are wound alternately parallel and at right angles to the component centerline.

The components illustrated in FIGS. 2b, 3 and 4 may be formed in the same manner as indicated above with the angle of winding being changed. That is in FIG. 2b, the alternate layers are wound counterdirectionally with one layer being wound at what may be termed a positive 45°angle with respect to the centerline and the adjacent layer at a negative 45° angle with respect to the centerline. In the embodiment of FIG. 3, the fiber is first wound in parallel to the centerline to form the first layer and the second layer is wound at right angles to the centerline such that alternate adjacent layers are wound at different angles with respect to the centerline. The embodiment illustrated in FIG. 4 is formed in the same manner as that of FIG. 2a with the fiber of each layer being wound in parallel to the centerline. In each of these embodiments, when the desired wall thickness is obtained, the outer member of the end fitting is slipped onto the inner member and clamped to secure the mid-section therebetween. The component is then cured in the manner indicated above.

Obviously, many modifications and variations of the present invention are possible in the light of the above teachings. It should therefore be understood that within the scope of the appended claims, the invention may be practiced otherwise than as sepcifically described.

I claim:

1. A method of manufacturing a component for transmitting forces comprising placing an inner member of end fitting at the end portions of a longitudinally extending self-supporting core member made from plastic or aerated plastic material, winding a fiber coated with an unhardened plastic about the core member beyond the length thereof and about each inner member of each end fitting, placing an outer member of the end fitting onto the inner member of the end fitting and the portion of the plastic coated fiber wound on the inner member such that the wound fiber portion is disposed between a portion of the inner and outer members of the end fitting, and hardening the plastic coated fiber to bond the wound fiber portion to the inner and outer members of the end fittings and to said core member, whereby said component having a fiber mid-section portion and an end fitting at each end is formed.

2. A method according to claim 1, wherein the fiber is made from carbon.

3. A method to claim 1, wherein the fiber is made from boron.

4. A method according to claim 1, wherein said core member is made from an aerated plastic, the plastic coating said fiber penetrating the aerated core member when the fiber is applied thereto thereby forming an adhesive bond with the core member.

5. A method according to claim 4, wherein the fiber is made from carbon.

6. A method according to claim 5, wherein the plastic coating on the fibers is an epoxy resin.

7. A method according to claim 6, wherein the carbon fiber has a diameter of about 8 to 12 microns.

8. A method according to claim 4, wherein the fiber has a diameter of about 5 to 12 microns.

9. A method according the claim 4, wherein the core member is made from an aerated plastic selected from the group consisting of polyurethane and polyacrylate.

10. A method according to claim 4, wherein the fiber is wound to a thickness of about 10 to 50 layers of fiber.

11. A method according to claim 4, wherein the fiber is wound in a direction parallel to the longitudinal centerline of the core member.

12. A method according to claim 4, wherein the fiber is wound in a direction parallel to the longitudinal centerline of the core member.

13. A method according to claim 1, wherein the fiber is wound to a thickness of about 10 to 50 layers of fiber.

14. A method according to claim 1, wherein the end fittings are radially coextensive with the fiber mid-section portion.

15. A method according to claim 14, wherein the end fitting defines a dish-shaped opening between the inner member and outer member for receiving the associated end of the fiber mid-section portion, the dish-shaped opening so shaped that the tangent of the dish-shaped opening at the point where the fiber mid-section portion meets the end fitting is substantially parallel to the longitudinal centerline of the component.

16. A method according to claim 1, wherein the inner member has a dish-like contoured surface portion in the area upon which the fiber is wound, the fiber being wound upon the dish-like contoured surface and forming tapered extremities for the mid-section portion of the formed component.

17. A method according to claim 15, wherein the fiber is passed through a plastic coating bath for coating the fiber with an unhardened plastic prior to winding upon the core and end fitting.

18. A method according to claim 1, further comprising the step of clamping the wound fiber portion between the inner and outer members.

19. A method according to claim 1, wherein the core member is substantially cylindrical and has a centrally disposed longitudinally extending centerline such that the hardened plastic coated wound fibers form a tubular mid-section portion.

20. A method according to claim 19, comprising the step of winding the fiber at angle with respect to the centerline of between 30° and 60°

21. A method according to claim 20, wherein the fiber is wound at an angle of 45°with respect to the centerline.

22. A method according to claim 20, comprising the step of winding the fiber to form a plurality of longitudinally extending layers of fiber.

23. A method according to claim 22, comprising the step of winding each layer of fiber codirectionally to the adjacent layer.

24. A method according to claim 22, comprising the step of winding each layer of fiber counterdirectionally to the adjacent layer.

25. A method according to claim 19, comprising the step of winding the fiber to form a plurality of longitudinally extending layers of fibers, including winding the fiber of at least one layer at right angles to the centerline and winding the fiber of at least one other layer in parallel to the centerline.

26. A method according to claim 19, comprising the step of winding the fiber in parallel to the centerline.

27. A method according to claim 1, wherein the fiber is one of a carbon, boron or glass fiber.

28. A method according to claim 1, wherein th core member is formed of one of a light weight plastic and an aerated plastic, and retaining the core member within the formed component without utilizing the core member for transmitting forces.

29. A method according to claim 1, wherein the step of winding the fiber includes starting winding at the contoured surface of the inner member of one end fitting and winding in the longitudinal direction of the core along the core member and onto the contoured surface of the inner member of the other end fitting.

30. A method according to claim 29, wherein the step of winding includes continuing winding of the fiber in the reverse direction from the inner member of the other end back along the core member and onto the inner member of the one end fitting, and continuing to reverse the direction of winding until the desired number of layers is completed.

* * * * *